United States Patent [19]

Murakami

[11] 3,852,198

[45] Dec. 3, 1974

[54] DIALYZING APPARATUS FOR ARTIFICAL KIDNEY

[75] Inventor: Kenkichi Murakami, Osaka, Japan

[73] Assignee: Kabushiki Kaisha Plastic Kogaku Kenkyusho, Osaka-shi, Osaka-fu, Japan

[22] Filed: Feb. 12, 1973

[21] Appl. No.: 331,531

[30] Foreign Application Priority Data
  Feb. 12, 1972  Japan.............................. 47-15077
  Mar. 2, 1972  Japan.............................. 47-22126
  Mar. 28, 1972  Japan.............................. 47-30966

[52] U.S. Cl.................... 210/321, 210/456, 210/494
[51] Int. Cl........................................... B01d 31/00
[58] Field of Search............. 210/22, 321, 494, 487, 210/456

[56]         References Cited
          UNITED STATES PATENTS
3,367,504  2/1968  Westmoreland................ 210/494 X
3,503,515  3/1970  Tomsic........................... 210/494 X
3,510,004  5/1970  Hoeltzenbein.................. 210/494 X

*Primary Examiner*—Frank A. Spear, Jr.
*Attorney, Agent, or Firm*—Armstrong, Nikaido & Wegner

[57]              ABSTRACT

A dialyzing apparatus for an artificial kidney having a core, a plurality of dialyzing membranes for blood which are wound in parallel to each other around the core, a plurality of partition walls which are interposed between the dialyzing membranes in order to prevent the surfaces of the membranes from coming in contact with each other, and an outer sleeve receiving a dialyzing part formed by the membranes and walls; the membranes being provided with inlets and outlets for blood, and the part enclosed with the outer sleeve outside the membrane being provided with outlet and inlet for dialyzing fluid.

10 Claims, 9 Drawing Figures

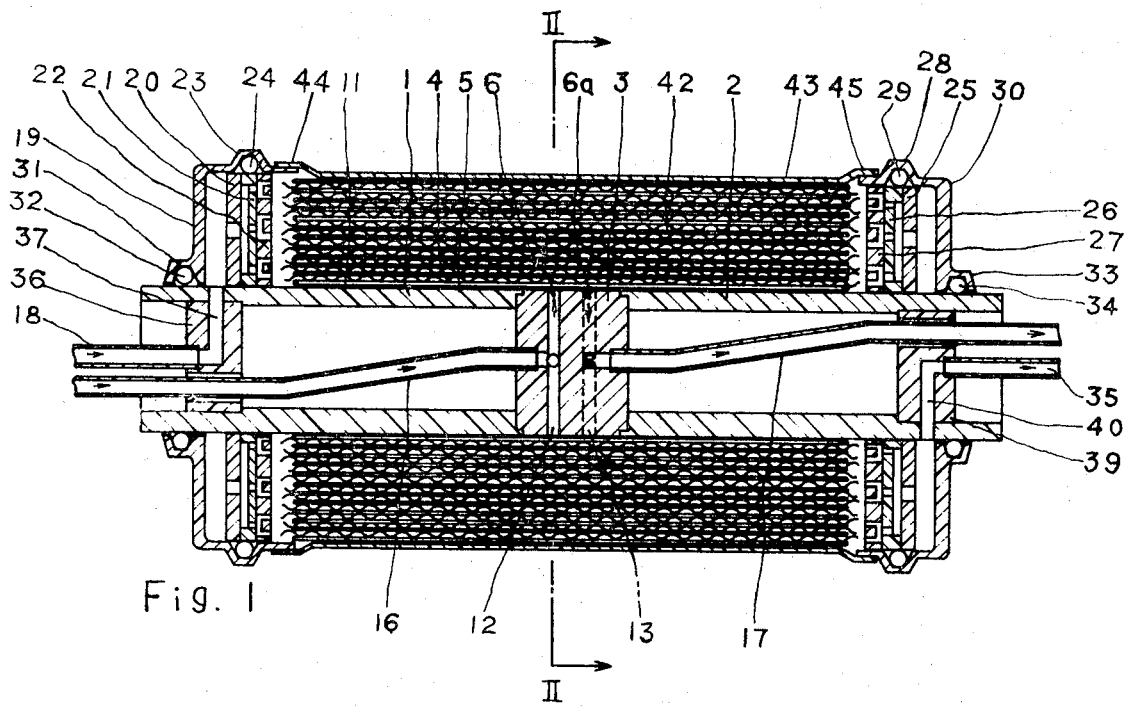
Fig. 1
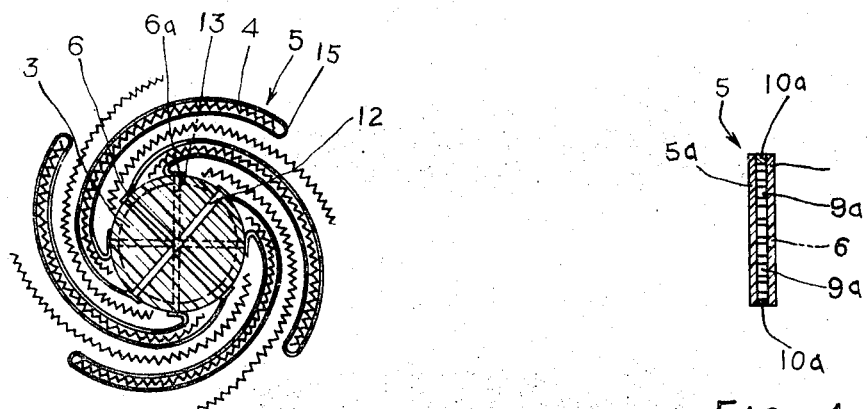
Fig. 2
Fig. 4
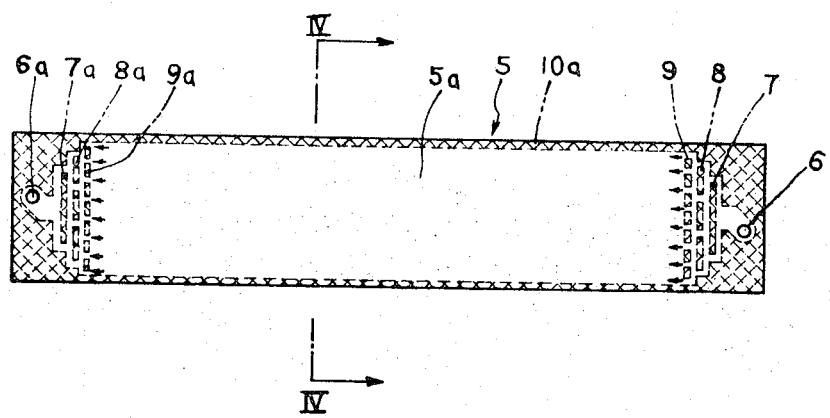
Fig. 3

3,852,198

DIALYZING APPARATUS FOR ARTIFICAL KIDNEY

BACKGROUND OF THE INVENTION

The present invention relates to a dialyzing apparatus for an artificial kidney.

A dialyzing apparatus of coil type which is lately used is more compact and more inexpensive than that of flat type, but the length of the tubular dialyzing membrane (hereinafter referred to as "tube") which forms coil will become long to obtain the surface area of tube required in dialyzing, so that a circulating pump is required to overcome the flow resistance due to blood current through the tube.

Further, for using the apparatus of a coil type, a bathtub in which dialyzing fluid for dipping the apparatus is contained is required, though the apparatus is compact in itself. Accordingly, there is another disadvantage that a whole apparatus containing such peripheral parts becomes large size.

If several tubes are arranged in the lengthwise direction of the core, the core becomes much too long to compact the dialyzing apparatus. In case the number of tube is increased by dividing it in the lengthwise direction of the core without increasing the core length, flow resistance due to blood current through tubes is becomes excessive. Each tube in the apparatus according to the present invention is arranged spirally around the core, and more preferably a partition wall is arranged between each tube. The tubes may be arranged in parallel in the lengthwise direction of the core.

In arranging each tube spirally around the core, it is preferable to connect the tube to the core or the pipe for leading blood to the tube with an adhesive so as to make the apparatus compact, since the mechanical fittings for connecting the tube to the core or the pipe are based on a complex mechanism and the apparatus becomes large-size in itself.

In the dialyzing apparatus according to the present invention, the dialyzing part consisting of dialyzing membrane and partition walls which are arranged spirally around the core are inserted in the outer sleeve, many inlet holes for dialyzing fluid are uniformly distributed in flow-adjusting plates located in one end of the sleeve and many outlet holes for the fluid are uniformly distributed in flow-adjusting plates located in the other end. The fluid pressure and flow rate of the dialyzing fluid in each inlet hole and outlet hole are nearly constant to unify the distribution of flow rate on the dialyzing membrane for better efficiency of dialysis. In the present apparatus, water contained in blood is readily transfused from blood to dialyzing fluid by making the pressure of dialyzing fluid negative pressure, since it is unnecessary to dip the dialyzing part into the above-mentioned bathtub and it is easy to seal the dialyzing part.

OBJECTS OF THE INVENTION

An object of the present invention is to provide a dialyzing apparatus in which each tube is made short so that blood circulates in it by natural pressure without the above-mentioned pump.

Another object of the invention is to provide a dialyzing apparatus in which the flow rate of the dialyzing fluid is unified to improve the efficiency of dialysis without dipping the apparatus into a bathtub containing dialyzing fluid.

These and other objects and advantages of the invention will be apparent from the following description and appended drawings.

BRIEF DESCRIPTION OF THE SEVERAL VIEWS OF THE DRAWING

FIG. 1 is a vertical cross-sectional view of an embodiment of the present invention, FIG. 2 is a transverse cross-sectional view taken on the line II—II of FIG. 1 with an outer sleeve removed, the view showing tubes which are going to be arranged around a core spirally, FIG. 3 is a plan view of the tube developed longitudinally, FIG. 4 is a transverse cross-sectional view taken on the line IV—IV of FIG. 3.

DETAILED DESCRIPTION

Figure 5:
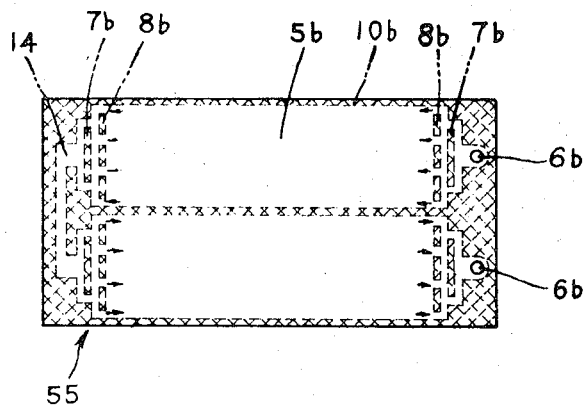
FIG. 5 is a plan view showing other embodiment of a tube.

Referring now to FIG. 1, there are shown cores 1 and 2, and a connecting member 3 for supplying and discharging blood.

Partition walls 4 and tubes 5 used as a dialyzing membrane are arranged spirally around the core 1 and 2. The partition walls made of a net, or the like, are arranged between each tube 5 for the dialyzing fluid to flow uniformly outside tubes 5 and blood to flow uniformly inside tubes 5.

A tube consisting of regenerated cellulose and other semipermeable membrane through which blood cells and protein contained in blood are not passed, but water and waste materials such as urea and creatinine are passed is usually used for a dialyzing membrane. Tubes 5 made of two semipermeable membranes which are bonded on each other with adhesive are used in this embodiment. As is shown in FIG. 3, blood flows in one direction fron an inlet port 6 to an outlet port 6a.

Both ends of the tube 5 are secured to the cores 1 and 2 on the outer surface by means of adhesive and the tube 5 is folded at the middle 15 of the length. The connecting member 3 has blood supplying holes 12 and blood discharging holes 13 formed in the member 3 radially of which lengthwise position and peripheral phases are different from each other, and the former is gathered in the member 3 and is led to blood supplying pipe 16 and the latter is gathered in the member 3 and is led to blood discharging pipe 17.

The blood supplying pipe 16 and blood discharging pipe 17 consist of flexible pipe. The ports 6 and 6a communicate with blood supplying holes 12 and blood discharging holes 13, respectively.

FIG. 3 is a plan view of the tube developed longitudinally, and the up and down direction in FIG. 1 shows the right and left direction in FIG. 3. The tubes 5 consist of two sheets of membrane 5a which are secured each other by interposing adhesive layer 10a formed by application of adhesive between them, whereby a passage of blood is made between the membranes 5a. 7, 8 and 9, respectively, are barriers for spreading uniformly flow of blood in the vertical direction in FIG. 3, and they are so arranged that flow through the barriers forms zigzag and the breadth of the barriers 7 are wide in two times of the barriers 8 and the barriers 8 in two times of the barriers 9. The barriers 7a, 8a and 9a are formed, respectively, with the same object as barriers 7, 8 and 9. Accordingly, flow through the barriers has uniform sectional area of flow and uniform moved distance, and resistance due to flow current is uniform, thereby being permitted an amount of blood flow at each part of the barriers uniform. Barriers 7, 8 and 9 can prevent stagnant flow of blood which occurs often around a port in the tube having no barriers, whereby there can be obtained a uniform effect of dialysis in each part of the dialyzing membrane to result in remarkable increase of efficiency as a whole.

Plastics such as polyethylene, polypropylene and polytetrafluoroethylene being inert to blood are usually used as a material for the core and the connecting member 3.

Solvent-type or reaction-type adhesives are not proper as an adhesive which is used for the dialyzing membrane to be bonded on the above plastics being inert to blood, because of lack of the bonding force thereby.

Fused-type (hot-melt) adhesives made from plastics or other materials as being compatible with the connecting member when they fused are most preferable to bond the membrane on the core and the connecting member.

In known method for directly applying adhesive on the surfaces to be bonded, one or both surfaces are quickly coated with adhesive fused by heat and then both surfaces are put together to tightly adhesive each other while the adhesive is hot. However, in this method, since it is difficult to coat the surface with adhesive in uniform thickness, it occurs uneven melt in the adhesive layer due to a difference of cooling speed thereof and the bonding force will not be uniform.

The method by which the coated surfaces are cooled after coating and then they are put together at desired position to be heated and pressed by using a hot iron from the outside of the dialyzing membrane, will permit to obtain a uniform fusing degree of adhesives and a uniform bonding force.

Adhesives of which viscosity lowers abruptly at a temperature over melting point are more preferable to usually use for the above object, for instance, ethylenevinyl acetate copolymer, acrylic resin, petroleum resin, and the like. An adhesive sold under the trade name of ESDYNE No. 8222-D (ethylene-vinyl acetate copolymer type) by Sekisui Chemical Co., Ltd. in Japan is very suitable to bond regenerated cellulose on polyethylene.

Adhesives, in a form of films, made by casting or other method are suitably cut and inserted between core (made of polyethylene, etc.) and tube (made of regenerated cellulose, polyvinyl acetate, silicone resin, etc), and then as stated before the adhesives are heated and pressed by using a hot iron from the outside of the membrane to uniform the thickness of adhesive layer. In this method, fusing degree of the adhesive layer will become more uniform than that in the above coating method, whereby pressing out of adhesive through between the membrane and the core caused by the adhesive layer being too much thick and lack of bonding force caused by the adhesive layer being too much thin will be improved to high degree. The films stated above are not those which are formed by directly coating the surface to be bonded, but those which are formed in suitable place other than the surface to be bonded.

FIG. 2 shows the relative position of the core and the tubes bonded theron, and each tube is folded only one time. But the tube may be folded three times or five times or other odd number of times. The tube may be folded without wrinkle and destortion for each end of the tube having an inlet port or outlet port to be connected to each inlet hole or outlet hole arranged radially in the connecting member 3.

The dialyzing part which consists of tubes 5 and partition walls 4 inserted between each tube 5 are wound spirally around the core and each surfaces of the tubes are brought into contact with the partition walls 4 under a suitable pressure. FIG. 2 shows tubes and partition walls which are going to be wound around the core, and the surfaces of the tubes 5 are not in contact with the walls 4 yet.

Referring to FIG. 5, tubes 55 consist of two sheets of membrane 5b which are secured to each other by interposing an adhesive layer 10b formed with application of adhesive therebetween. The tubes 55 are constructed so that blood flows along a U-turn course therein. There are shown in this figure an inlet port 6b and an outlet port 6b' for blood, and barriers 7b and 8b for spreading uniformly flow of blood in the direction perpendicular to the direction of the flow. The effect of the barriers 7b and 8b is the same as that of the above-mentioned barriers.

The inside of the tube 55 is divided into two parts in the lengthwise direction of the core. Blood which flows in from the inlet port 6b is discharged through the duct 14 connecting the two parts from the outlet port 6b' as shown by arrows.

Figure 6:
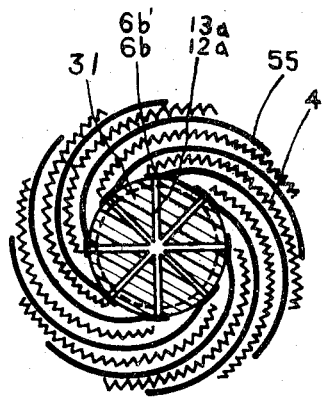
FIG. 6 is a view similar to FIG. 2 but showing the case that the tube shown in FIG. 5 is arranged around the core.

FIG. 6 shows tubes 55 bonded on the core. A connecting member 31 for supplying and discharging blood has blood supplying holes 12a and blood discharging holes 13a radially formed in the member 31 of which lengthwise positions are different from each other and peripheral phases are correspond to each other (In the embodiment shown in FIG. 2, lengthwise positions and peripheral phases of holes 12 and 13 are different from each other). Holes 12a and holes 13a communicate with each other in the member 31 for the holes 12a to be led to blood supplying pipe 16 and the holes 13a to be led to blood discharging pipe 17.

Ends of the tube are bonded on the core so that the inlet ports 6b communicate to the blood supplying holes 12a and the outlet ports 6b' communicate to the blood discharging holes 13a.

The dialyzing part which consists of the tubes 55 and partition walls 4 inserted between each tube 55 is wound around the core spirally and each surface of the tube is brought into contact with the partition walls 4 under a suitable pressure.

When the tubes 5, which are not folded or are folded an even number of times, as shown in FIG. 3, are arranged around the core spirally, the free ends of the tubes are brought into contact with the outer sleeve 43. Accordingly, outlet holes 6a in the free ends may be communicated to a leading pipe through a connecting member, arranged in the outer sleeve, in which the holes communicate with each other, whereby blood may be led from the core to blood discharging pipe. This will cause, the same as the aforementioned embodiment, the length of each tube which shorten to results in a decrease of flow resistance of blood.

To obtain a simple mechanism, it is preferable to arrange both inlet ports and outlet ports in the core.

In the above embodiments, the direction of blood flow may be reversed so that blood flows from the outlet port 6a to the inlet port 6.

Aqueous solution, in which ions of potassium, magnesium, acetic acid, and the like supplement a salt to equalize a concentration of the main electrolyte to that in blood by using glucose or pentasaccharide to adjust osmotic pressure are usually used as a dialysing fluid to discharge waste materials accumulated in blood.

The dialyzing fluid flows in from the inlet tube 18 made of flexible tube to the connecting member 36 for combining the fluid, and then flows in the space formed between the end plate 19 and the first flow-adjusting plate 20 through holes 37 formed radially in the connecting member 36. The connecting member 36 is made of elastic material, and inserted into the core 1 so as to come in contact with the inside surface thereof without any gap to make the apparatus air-tight.

Figure 7:
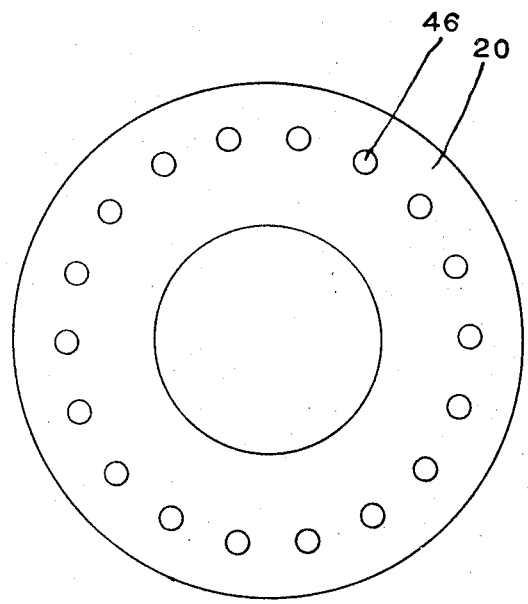
FIG. 7 is a plan view of the first flow-adjusting plate used for dialyzing fluid to flow uniformly.

As is shown in FIG. 7, the first flow-adjusting plate 20 is provided with equispaced holes 46 arranged on the coaxial circle. Since the thickness of the plate and the diameter of each hole are formed uniformly, the fluid pressure and the flow rate are constant in each hole.

Figures 8, 9:
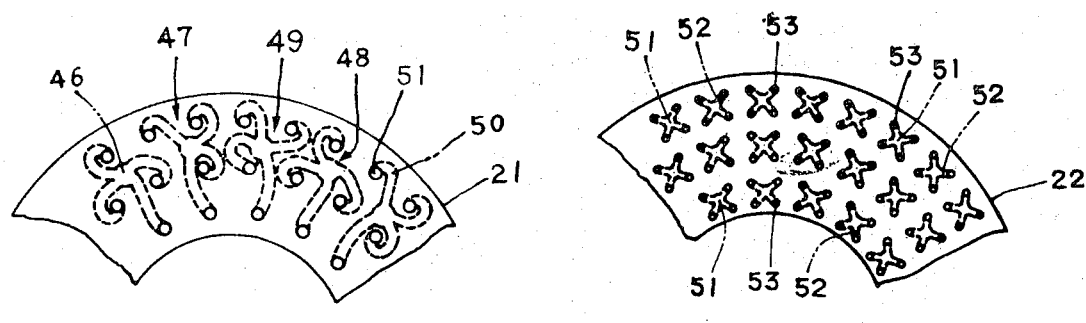
FIG. 8 is a fragmentary plan view of the second flow-adjusting plate used for dialyzing fluid to flow uniformly.
FIG. 9 is a fragmentary plan view of the third flow-adjusting plate used for dialyzing fluid to flow uniformly.

The arrangement of grooves 50 and holes 51 formed in the second flow-adjusting plate 21 are shown in FIG. 8, and various shapes of grooves, which are combined with each other properly, are formed in it so as to provide uniform distribution from the hole.

The pattern 47 formed by the grooves 50 provides two holes 51 on the outside circle and a hole on the inside and middle circle of the plate 21, respectively, these three circle being cocentric; the pattern 48 provides a hole on the outside and inside circle, respectively, and two holes on the middle circle of the plate 21; the pattern 49 provides two holes on the outside circle and a hole on the inside and middle circle; thereby the whole pattern is made as illustrated in FIG. 8. When these three patterns 47, 48 and 49 are arranged along a circle in this order, the ratio of the number of the holes on the outside, the middle and the inside circle is 5 : 4 : 3. Therefore, when said three cocentric circles are 5 : 4 : 3 in the ratio of the diameter, on each circle the holes will be arranged uniformly.

Each groove forming the pattern which is in the second flow-adjusting plate is formed to be the same shape and the same sectional area and the same length of flow from the holes in the first flow-adjusting plate to the holes in the second flow-adjusting plate, and these grooves may be formed in the first flow-adjusting plate. Likewise, in the pattern formed by grooves 52 and hole 53 in the third flow-adjusting plate 22 shown in FIG. 9, the shape and the sectional area of each groove 52 is preferably the same. In each passage of flow, which is formed by the grooves, the shape of the section, whole area of the section, the length of each grooves from one inlet hole to outlet holes and the number of divergence should be the same at every parts, since lack of uniformity of the above factors will cause the flow of dialyzing fluid to be lack of uniformity. This is also the same regarding the discharging flow.

While three sheets of flow-adjusting plates are referred to herein, the number of plates is not limited to three when the holes of the flow-adjusting plate of downstream are distributed closer each other than that of upper stream, and the pressure at each part of dialyzing fluid passing the holes and the amount of flow at each part are equal, respectively.

The flow of dialyzing fluid will be improved in uniformity by disposing a glass fiber mat or porous plate of uniform thickness between the dialyzing part and the flow-adjusting plates.

The flow-adjusting plates which are used at both ends of the outer sleeve may be provided only at one side thereof.

Each flow-adjusting plate may be bonded to the others so as to prevent leakage of the fluid by applying adhesive on the surfaces.

25, 26 and 27 show the first flow-adjusting plate, the second flow-adjusting plate and third flow-adjusting plate of outlet side of flow respectively. The construction and function are the same as those of inlet side of flow except the direction of flow is opposite. End cover 19 is provided with annular projections 23 and 31 having recesses receiving O-ring 24 and 32 made of elastic material, respectively, whereby preventing leakage of the dialyzing fluid through between the end cover 19 and the core 1 or the flow-adjusting plates. End cover 30 of outlet side of the flow is provided with annular projections 28 and 33 having recesses receiving O-ring 29 and 34 made of elastic material, respectively. Dialyzing fluid flows through the passage formed between the end cover 30 and the first flow-adjusting plate 25 and then through hole 40 formed in the connecting member 39, and thus is discharged out of the apparatus through outlet pipe 35 made of flexible pipe. The flow of dialyzing fluid may be in opposite direction.

The outer sleeve 43 covers the dialyzing part 42 constructed by tubes and partition walls and presses under proper pressure inwardly against the part 42. And this is accomplished by heating the outer sleeve to shrink itself after covering the part 42. The outer sleeve may be formed by winding a sheet and bonding the edges to each other by adhesive or adhesive tape.

The ends 44 and 45 of the outer sleeve 43 lap over the ends of the end cover 19 and the end cover 30, and the lapped parts may be sealed by applying adhesive or adhesive tape to make the inside air-tight, thereby permitting the pressure of the dialyzing fluid to be lower than that of the blood in the tube resulting in effective elimination of water in the blood through the dialyzing membranes during the dialyzing process.

Further, the apparatus of the present invention does not require the use of blood circulating pump which is expensive.

According to the present invention, the dialyzing fluid discharged from the apparatus will be uniformly contaminated by the excretion from the blood, and thus the dialyzing fluid can be used effectively. While FIG. 1 shows the sectional view of the apparatus provided with the tubes for one way flow shown in FIG. 3, with the tubes being arranged as shown in FIG. 2, the sectional view of the apparatus provided with the tubes for two way flow as shown in FIG. 5, with the tube being arranged as shown in FIG. 6, is likewise as above.

It has been found that according to the present invention sufficient dialyzing function will be obtained by a compact apparatus in which the tubes are arranged around the core spirally and in parallel with each other. In addition, such arrangement permit the tube length to shorten to result in decrease of the resistance due to fluid current.

The blood supplying pipe and blood discharging pipe are arranged in the core in this embodiment, but they may be arranged out of the core to connect to the tube directly, if desired.

Variations and modifications may be made within the scope of Claims and portions of the improvements may be used without others.

What is claimed is:

1. A dialyzing apparatus for an artificial kidney comprising an outer sleeve, a core arranged within the outer sleeve, said core including passage means communicating to the exterior of said outer sleeve, a plurality of tubes made of semipermeable dialyzing membranes in which blood flows, and partition walls interposed between each tube; said tubes being arranged around the core in the peripheral direction, said tubes and partition walls being arranged in parallel to each other around the core spirally, said tubes having inlets and outlets for blood, said inlet and outlets being connected to said passage means, and a passage for dialyzing fluid being formed outside said tubes between an inlet and an outlet for dialyzing fluid at both ends of said outer sleeve and flow adjusting plate means positioned within said outer sleeve at the end thereof for causing a uniform flow of dialyzing fluid through said outer sleeve.

2. The dialyzing apparatus for an artificial kidney of claim 1, wherein said tubes are made of two sheets of semipermeable membranes adhered to each other, and each tube has an inlet at one end and an outlet at the other end, whereby the flow of blood is in one direction within each tube.

3. The dialyzing apparatus for an artificial kidney of claim 2, wherein each tube includes barriers arranged zigzag near said inlet and outlet whereby blood flow is uniform through said tube.

4. The dialyzing apparatus for an artificial kidney of claim 2, wherein said passage means includes a connecting member, to which a blood supplying pipe and a blood discharging pipe are connected, and said core includes a plurality of blood supplying holes and blood discharging holes formed radially thereon wherein said holes communicate with said inlets and outlets of said tubes.

5. The dialyzing apparatus for an artificial kidney of claim 4, wherein said tubes are bonded on the outer periphery of said core by an adhesive layer therebetween.

6. The dialyzing apparatus for an artificial kidney of claim 1, wherein said tubes are made of two sheets of semipermeable membranes adhered to each other, the interior of each tube being divided into two parts each tube having an inlet and an outlet at one end of it and a passage communicating with the two parts at the other end.

7. The dialyzing apparatus for an artificial kidney of claim 6, wherein each tube includes barriers arranged zigzag near said inlet and outlet and a passage whereby blood flow is uniform through said tube.

8. The dialyzing apparatus for an artificial kidney of claim 6, wherein said passage means includes a connecting member, to which a blood supplying pipe and a blood discharging pipe are connected, and said core includes a plurality of blood supplying holes and blood discharging holes formed radially thereon, wherein said holes are inlets and outlets of the tubes.

9. The dialyzing apparatus for an artificial kidney of claim 8, wherein said tubes are bonded on the outer periphery of said core by an adhesive layer therebetween.

10. The dialyzing apparatus for an artificial kidney of claim 1, wherein said tubes and partition walls are pressed by said outer sleeve.

* * * * *